(12) United States Patent
Hagan

(10) Patent No.: US 9,742,828 B2
(45) Date of Patent: Aug. 22, 2017

(54) SYSTEM FOR OPTIMISING WIRELESS DATA DOWNLOADS

(71) Applicant: Chris Hagan, Halifax (GB)

(72) Inventor: Chris Hagan, Halifax (GB)

( * ) Notice: Subject to any disclaimer, the term of this patent is extended or adjusted under 35 U.S.C. 154(b) by 0 days.

(21) Appl. No.: 14/443,375

(22) PCT Filed: Nov. 15, 2013

(86) PCT No.: PCT/GB2013/053028
§ 371 (c)(1),
(2) Date: May 16, 2015

(87) PCT Pub. No.: WO2014/076496
PCT Pub. Date: May 22, 2014

(65) Prior Publication Data
US 2015/0295972 A1    Oct. 15, 2015

(30) Foreign Application Priority Data

Nov. 16, 2012  (GB) .................................. 1220673.6

(51) Int. Cl.
*H04L 29/06*    (2006.01)
*H04W 4/02*    (2009.01)
(Continued)

(52) U.S. Cl.
CPC ............ *H04L 65/60* (2013.01); *H04B 17/27* (2015.01); *H04L 67/06* (2013.01); *H04L 67/10* (2013.01);
(Continued)

(58) Field of Classification Search
None
See application file for complete search history.

(56) References Cited

U.S. PATENT DOCUMENTS

| | | | | |
|---|---|---|---|---|
| 2004/0204114 | A1* | 10/2004 | Brennan | H04B 7/04 455/562.1 |
| 2005/0136981 | A1* | 6/2005 | Rensburg | H04W 16/28 455/562.1 |

(Continued)

FOREIGN PATENT DOCUMENTS

KR    20080014560 A    2/2008

OTHER PUBLICATIONS

IPEA, International Preliminary Report on Patentability for PCT/GB2013/053028, issued Oct. 29, 2014.

(Continued)

*Primary Examiner* — Angela Nguyen
(74) *Attorney, Agent, or Firm* — DNL ZITO; Richard A. Castellano

(57) ABSTRACT

A system (10) for optimizing wireless data downloads is described. An embodiment of the system is manifest as a file server (18) comprising: a data storage device (22) adapted to store multimedia content; and a wireless access point (36) adapted to wirelessly interconnect, via a wireless data signal, the data storage device (22) to a wireless device (52), the file server (18) being configured to wirelessly transmit selected portions of the stored multimedia content to the wireless device (52), and being characterized by: a directional signal strength gauge (60) configured to determine the strength of the wireless data signal at the wireless device and to determine a direction (72) from the wireless device to the wireless access point.

19 Claims, 2 Drawing Sheets

(51) Int. Cl.
    *H04B 17/27*     (2015.01)
    *H04L 29/08*     (2006.01)
    *H04W 74/06*     (2009.01)
    *H04W 88/08*     (2009.01)

(52) U.S. Cl.
    CPC ............. *H04L 67/42* (2013.01); *H04W 4/026* (2013.01); *H04W 74/06* (2013.01); *H04W 88/08* (2013.01)

(56) References Cited

U.S. PATENT DOCUMENTS

| | | |
|---|---|---|
| 2007/0249288 A1 | 10/2007 | Moallemi et al. |
| 2007/0258420 A1* | 11/2007 | Alizadeh-Shabdiz .. G01S 11/06 370/338 |
| 2008/0090520 A1 | 4/2008 | Camp et al. |
| 2012/0220224 A1 | 8/2012 | Walker |
| 2016/0011294 A1* | 1/2016 | Kim ...................... G01S 5/0236 455/456.1 |

OTHER PUBLICATIONS

Applicant, Reply to Written Opinion of the IPEA for PCT/GB2013/053028, Oct. 1, 2014.

IPEA, Written Opinion of the International Preliminary Examining Authority for PCT/GB2013/053028, issued Sep. 24, 2014.

ISA, International Search Report for PCT/GB2013/053028, Mar. 17, 2014.

Marco A. Gonzalez et al.: "Guide-gradient: A Guiding Algorithm for Mobile Nodes in WLAN and Ad-hoc Networks," Wireless Personal Communications, vol. 57, No. 4, Dec. 20, 2009 (Dec. 20, 2009), pp. 1-24, XP055105336, ISSN: 0929-6212, DOI: 10.1007/s11277-009-9865-2, pp. 1-9.

Dongsu Han et al.: "Access Point Localization Using Signal Strength Gradient," Passive and Active Network Measurement, Springer Berlin Heidelberg, Berlin, Heidelberg, vol. 5448, Apr. 1, 2009 (Apr. 1, 2009), pp. 99-108, XP019116307, ISBN: 978-3-642-00974-7, pp. 99-102, pp. 105-107.

UKIPO, Section 17 Search Report for GB1220673.6, Report issued Apr. 24, 2013.

* cited by examiner

SYSTEM FOR OPTIMISING WIRELESS DATA DOWNLOADS

This invention relates to an apparatus, system and method for optimising data downloads, and in particular, but without limitation, to an apparatus, system and method for optimising high-speed video content downloads.

It has become customary in recent years for large electronic files to be made available on the internet so that they can be downloaded by users of the internet. In many cases, users have to pay to use such services, in particular, for downloading video content and feature films. Systems are well known whereby users can subscribe to file server web sites that allow subscribers, in many cases, for a subscription fee, or pay-per-download fee, to download content.

The actual cost of downloading is dependent on a number of factors, including the license fee charged by the originator of the content being downloaded, the cost of the necessary equipment to perform the upload/download and to broadcast/view the downloaded material, and the cost, to the provider and end user of the download itself, that is to say, the internet access charges. As greater use, and importance, is placed on web-based content downloading, so the need increases for ever faster and cheaper delivery systems to facilitate the same.

Conventional online downloading occurs via a content provider uploading content to a web server, which is accessible to end users via the internet. End users can browse and download selected content using various protocols, such as hypertext transfer protocol (HTTP) or a web site, which is often used to provide an intuitive interface for a file transfer protocol (FTP) data server via which the content itself can be accessed and downloaded over the internet. Download speeds are ultimately restricted by the upload speed of the file server, that is the speed at which the content can be put onto the internet, and the end user's download speed, that is the speed at which the end user's equipment can pull the data off the internet. In single user applications, the upload and download speeds are often adequate, but where multiple end users are attempting to download the same content simultaneously, the available bandwidth can become inadequate, leading to failed or delayed delivery of content to end users.

There are several known ways to address the above problems, including mirroring file server content on several web-based file servers to enable the bandwidth to be shared between multiple file servers, thus reducing the demands placed on individual file servers. Masked re-allocation of end user download requests to different mirror servers is a well-known example of how bandwidth restrictions can be addressed in this way.

Nowadays, there is an increasing demand for mobile downloading, which is to say, downloading of internet-based content onto portable devices, such as mobile telephones, tablet computers and laptop computers. Various existing technologies exist to meet this requirement, such as short-range wireless network connectivity solutions, such as WiFi, and longer-range wireless connectivity provided by 3G and 4G telephone networks. WiFi provides a particularly convenient internet connectivity solution as it emulates a wired Ethernet connection, thus providing fast download speeds, and since WiFi networks can often be accessed independently of commercial telephone networks, are often used provide a free, high speed internet connection. However, the range of WiFi is typically restricted to a range of 200 m or so from the WiFi Access Point (AP), and so a user must be physically located within range of the AP to be able to access a WiFi service. Nevertheless, the convenience of automatic connection to WiFi networks, coupled with the fact that they can be free to use, renders them a preferred connection method in many situations.

One known problem with WiFi networks is that the maximum download speed is dependent on the distance between the WiFi device and the AP. This reduction in maximum download speed is attributable not to the speed of the network connection itself, but rather to increases in error rates as the distance from the wireless device to the AP increases, due to weakening signal strength with distance. In other words, the more errors there are, the more data packets need to be re-sent to obtain "clean" data transmission, thus effectively slowing the download speed. Moreover, obstacles placed in, or passing through the line of sight between the WiFi device and the AP can increase error rates, and so there is a general requirement, to maximise data transfer rates, for a user of a WiFi-enabled device to be positioned as close as possible to, and in direct line of sight of, the AP. Since APs are often hidden from view, it can be difficult for an end user to position him or herself in an ideal location to maximise download speeds, and the invention aims to provide a solution to this problem.

It is known to provide a wireless device with a signal strength indicator, and systems utilising signal strength indicators are described in published patent applications US2012220224 (Walker, 30 Aug. 2012), US2008/090520 (Camp, 17 Apr. 2008) and KR20080014560 (LG, 14 Feb. 2008).

However, known systems, whilst enabling a user to know whether the received signal is "good" or "bad", do not indicate a direction to the AP, and so a user not knowing where the AP is located (and many APs nowadays are concealed from view for aesthetic reasons), and wanting to improve his/her wireless reception often needs to move around randomly trying to find locations of improved signal strength. This invention aims to provide a solution to one or more of the aforementioned problems and/or to provide an improved and/or alternative wireless system.

An aspect of the invention provides a file server comprising: a data storage device adapted to store multimedia content; and a wireless access point adapted to wirelessly interconnect, via a wireless data signal, the data storage device to a wireless device, the file server being configured to wirelessly transmit selected portions of the stored multimedia content to the wireless device, and being characterised by: a directional signal strength gauge configured to determine the strength of the wireless data signal at the wireless device and to determine a direction from the wireless device to the wireless access point.

By providing a directional signal strength gauge, a user of the wireless device is suitably provided with signal strength information, but also, in certain embodiments, can be presented with a direction in which to travel to move towards the AP and/or to improve his/her wireless reception, and hence, in certain situations, to increase his/her wireless download speed.

Other aspects of the invention are set forth in the following description and in the accompanying claims.

According to another aspect of the invention there is provided a means of encouraging users of wireless devices to position themselves as close as possible to a wireless access point (AP) to which the said wireless device or devices can connect.

Suitably, the means of encouraging comprises means for encouraging the initiation of a download from as close as possible to the wireless access point. Such means may suitably comprise a near field communication (NFC) tag located near to, or at, the wireless access point, which NFC tag is adapted to initiate a download to the wireless device. In one example, the NFC may be pre-loaded with data identifying a particular electronic file to download such that when a suitably NFC-enabled wireless device is brought into close proximity with the NFC tag, a download is automatically initiated. Such a system increases the likelihood of a short-range, and thus high-speed, wireless connection, at least initially, between the wireless access point and the wireless device such that even if the wireless device is subsequently moved away from the wireless access point, as large a proportion as possible of the download is completed before the wireless signal strength diminishes to the extent that a noticeable, or significant, reduction in download speed is experienced.

By encouraging users of wireless connected devices to position themselves as close as possible to the wireless access point, download speeds can be maximised. By maximising download speeds to individual wireless devices in such a manner, the wireless network is suitably used more efficiently, and may suitably be freed-up more quickly for subsequent users.

According to another aspect of the invention, there is provided a downloading system comprising a wireless access point and a wireless device adapted to connect to the wireless access point, and further comprising means for indicating a distance between the wireless device and the wireless access point and a direction from the wireless device to the wireless access point.

Since there is often a known relationship between distance to the access point, signal strength and expected download speed, by knowing one's distance from the access point, by indicating the distance between the wireless device and the access point, a user of the wireless device may be able to determine a maximum download speed over the wireless connection.

Similarly, by indicating the direction of the access point from the user, a user of the wireless device may be able to determine which way to move to increase and/or to maximise his or her download speed.

By providing users of wireless devices with the ability to speed-up their WiFi connections, and by encouraging them to do the same, collective download speeds may be increased, and/or average individual's download speeds may be increased, by reducing repetitious transmission of "bad" data packets over the wireless network.

The means for indicating the distance between and a direction from the wireless device and the wireless access point may comprise indicia extending radially outwardly from the access point. Such indicia, where provided, may comprise calibrations, such as expected signal strength (e.g. in dB), expected download speeds (e.g. in Mbps) and/or download times for a given download size (e.g. 1 minute per movie, or 1 second per track). The indicia, where provided, may comprise floor markings, such as circles or part-circles on a floor surrounding the access point.

Additionally or alternatively, the means for indicating the distance between the wireless device and the wireless access point may suitably comprise a signal strength meter or gauge. The signal strength meter of gauge may suitably be calibrated in terms of any one or more of the group comprising: signal strength (e.g. in dB); download speed (e.g. in Mbps); and download time for a given download size (e.g. 1 minute per movie, or 1 second per track). The signal strength meter may be provided in the form of a graphical user interface (GUI) on a display screen of the wireless device thus providing an indication to a user of the device of his or her proximity to the wireless access point and an expected download speed.

Additionally or alternatively, the means for indicating the direction from the wireless device to the wireless access point may suitably comprise a pointer, which can suitably displayed on a display screen of the wireless device. By providing a direction to the wireless access point from a user's instantaneous position, a user is able to readily determine which way to move to maximise his or her download speed.

The means for indicating the distance between the wireless device and the wireless access point and the means for indicating the direction from the wireless device to the wireless access point may suitably be integrated, for example, as a vector displayed on a display screen of the wireless device. Such a combined display may readily indicate the instantaneous download speed, but may also provide an indication as to how the download speed may be increased, and optionally to what extent, by moving a certain distance in a certain direction.

The wireless device suitably comprises means for determining the direction from the wireless device to the wireless access point, which suitably comprises a gyroscope or other motion sensing device coupled with a signal strength meter. An empirical and/or iterative approach may be used to determine the direction from the wireless device to the wireless access point, such as by monitoring an increase or decrease in detected signal strength in different directions of movement, and by correlating the data to indicate, probabilistically, which direction of travel is most likely to result in an increase in signal strength: that direction being representative, in most cases, of the direction from the wireless device to the wireless access point.

To reduce and/or avoid the need to download data over the internet, the wireless access point may suitably be operatively connected to a local file server, which is suitably a mirror, or partial mirror, of a web-accessible file server. Thus, the most frequently downloaded files can be transferred to the local file server thus permitting a high-speed network connection, for example, a gigabit Ethernet connection, to be established between the local file server and the wireless access point, which usually provides much faster downloading capabilities than would be the case if each file were to be downloaded directly over the internet from a web-based file server. Such a system suitably reduces internet-based network traffic.

The web-based server and the local file server may suitably comprise synchronisation software to enable content to be synchronised. Such a system suitably enables content to be transmitted once from the web-based server to the local file server, whilst allowing multiple downloads of content stored on the local file server via the access point.

A system incorporating the features of the above invention may suitably be provided in public spaces, such as in shops, cinemas, transport hubs (e.g. airports, train stations etc.) where a demand may exist for new entertainment content to be downloadable. A system incorporating the aforementioned features may take the form of a booth or display area comprising a local file server connected to the internet, via mirroring or synchronisation software, to a web-based file server and a wireless access point. Such a booth or display area may additionally comprise a display screen enabling users to view, browse and purchase content from the local file server or the web-based file server and to download it via a wireless connection.

According to a further aspect of the invention, there is provided a method of determining a direction towards a wireless access point comprising the steps of: by repeatedly polling the access point and downloading a data file of a known size; measuring the time it takes to complete each download to yield an instantaneous download speed; monitoring and the position of the wireless device and plotting measured download speed at different measured positions; interpolating between the data points to model the download speed as a function of position; and, based on the model, determining a direction from the wireless in which the download speed increases most rapidly and determining that the said direction from the wireless in which the download speed increases most rapidly corresponds to the direction of the wireless access point from the wireless device.

The method may be performed in software, for example, an application, on the wireless device, and the direction to the wireless access point may be indicated in a graphical user interface of the wireless device.

Preferred embodiments of the invention shall now be described, by way of example only, with reference to the accompanying drawings, in which.

Figure 1:
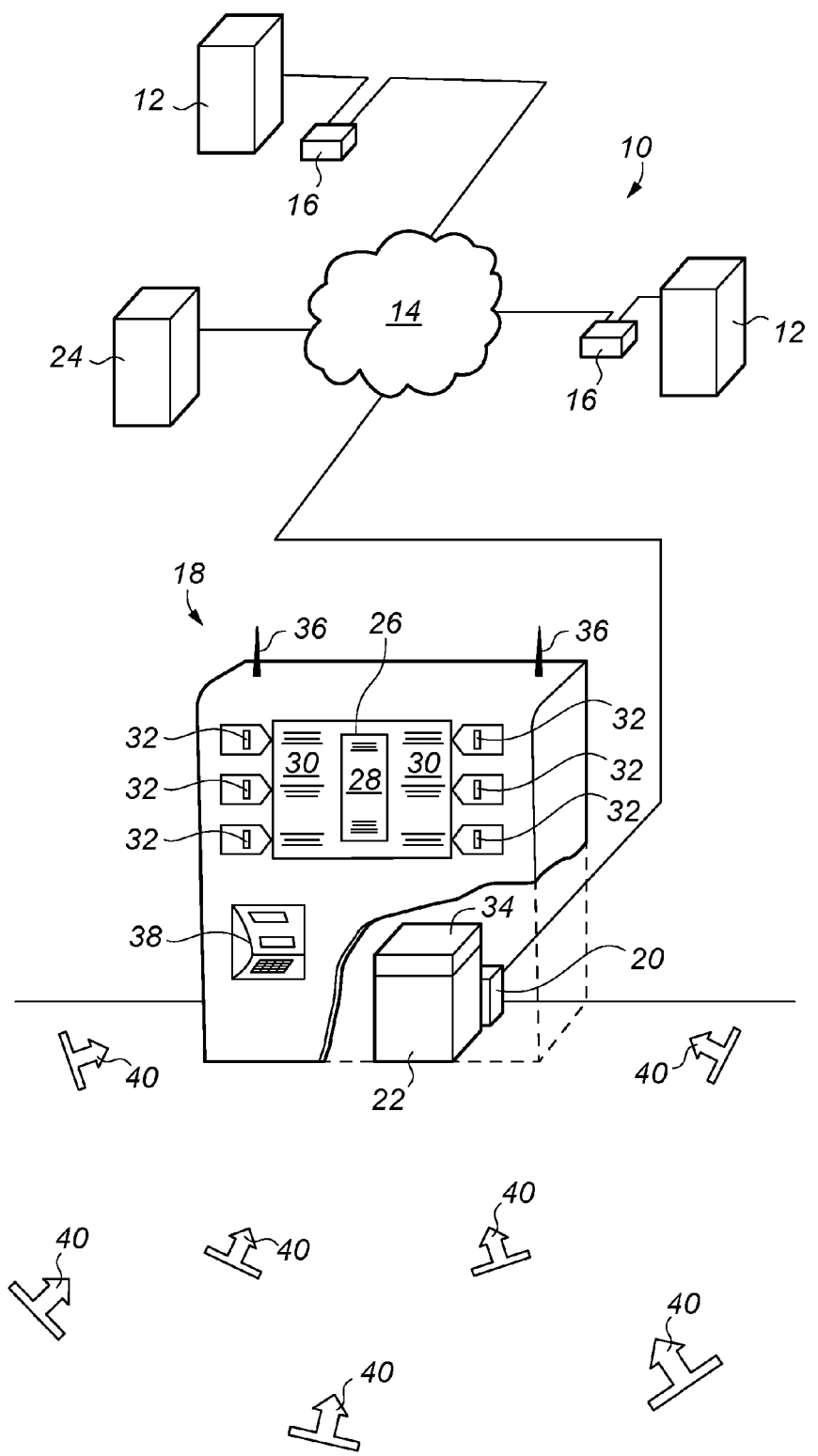
FIG. 1 is a schematic representation of a download system in accordance with the invention.

In FIG. 1, a download system according to the invention 10 comprises one or more web-based file servers 12 connected to the internet 14 via internet gateways 16, and a download booth 18 comprising an internet access device, such as a router 20 connected to a local file server 22. The local file server 22 is loaded with synchronisation software allowing selected content of the local file server 22 to be synchronised with content on any one or more of the web-based file servers 14, via the internet 14. The synchronisation settings can be adjusted remotely over the internet, via an administrator platform 24, which enables the content, and web-accessible web pages of the web-based file servers, to be changed. In addition, the administrator platform 24 enables the local file server to be configured remotely, for example, via a remote desktop connection to a hidden instance of the local file server's operating system.

The local file server 22 has an operating system providing a graphical user interface (GUI) that is displayed on a display screen 26 of the booth 18. The GUI has a browsing window portion 28 that allows users to browse and search for content on the file server using a touch screen interface. When a user selects content of interest from the browsing window 28, surrounding portions 30 of the GUI are populated with information, such as samples, clips and text relating to a selection of content based on and/or related to the user's selection. The surrounding portions 30 of the GUI are associated, graphically, with NFC tags surrounding the screen 26, which when a user places his or her NFC-enabled mobile device next to, initiates a download of the selected content to the user's mobile device (not shown).

The download is initiated via a WiFi connection established between a gateway device 34 operatively connected to the file server 22, which gateway device 34 is configured to transmit the download to the mobile device (not shown), via the antenna 36 of one or more access points (not visible). The booth 18 thus draws users towards the access point, which maximises the download speed over the WiFi connection.

The booth 18 is also provided with a payment terminal 38, which is configured to receive and/or process payments for content, for example, via credit/debit cards, cash, online funds transfers, electronic wallet payments (such as Google Wallet®, PayPal®), NFC payments, charging to a mobile phone, charging to an online account, and so forth. The payment terminal interfaces with the local file server 22, and with the administrator platform 24 for reconciling payment transactions with user data and downloaded content. Thus, repeat users of the system can re-use previously used payment data, and/or have the browsing window automatically populated based on previous selections and choices.

Surrounding the booth 18 are indicators, in the illustrated example, graphical floor markings 40 indicating expected data transfer rates at various distances from the booth 18, and arrows indicating the direction to move to increase the data transfer rate.

Figure 2:
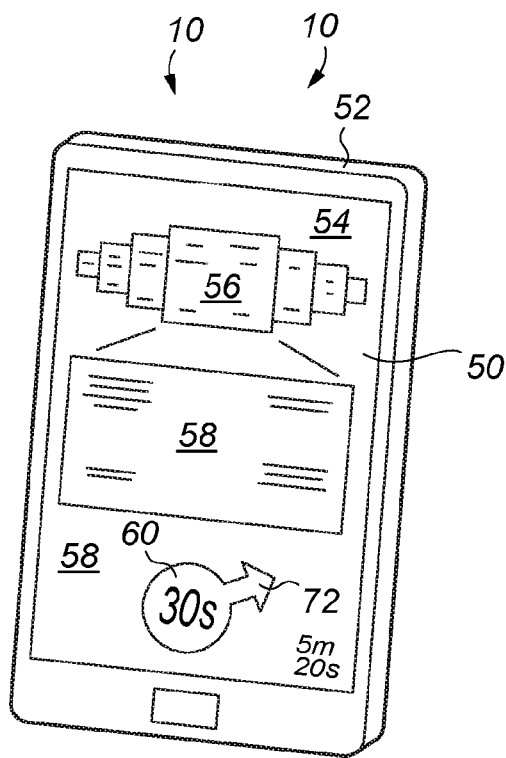
FIG. 2 is a schematic representation of a graphical user interface for a wireless mobile device in accordance with the invention.

In FIG. 2, a display interface 50 for a mobile device 52 is shown, which comprises a web-based interface portion 54, such as an internet browser window, via which a user can access the operating system of the local file server 22 via a WiFi connection, or one of the web-based file servers 12 via a mobile telephony-based internet connection. The web-based interface portion displays available downloadable content in the form of a slider 56 that a user can scroll and browse in a known manner. When a user highlights or selects particular content, an information window 58 below the slider 56 is populated with relevant information, such as a synopsis of the selected content, its price and so on.

Also on the display interface 50 is a download speed indicator area 58 comprising a gauge 60 configured to indicate the estimated download time of the content selected in the slider 56 and information window 58. The download time is calculated by repeatedly testing the download speed and updating the gauge 60 accordingly. This is achieved by repeatedly polling the access point 36 and downloading a data file of a known size, and measuring the download time to complete the download to yield an instantaneous download speed. The download speed can then by multiplied by the file size of the selected content to estimate the download time for the selected file, which time can be shown in the gauge area 60 of the display interface.

By repeatedly testing the instantaneous download speed, it is possible for the mobile device 50 to record changes in download speed over time. If the wireless device 50 also comprises a gyroscope, compass or motion sensor, it is possible to correlate increases and decreases in measured download speed with different directions of travel, if the wireless device 50 is moving.

Figure 3:
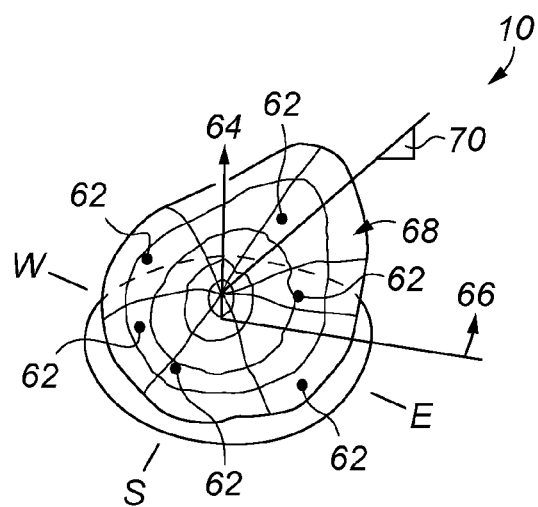
FIG. 3 is a schematic polar graph of measured download speed versus position.

In FIG. 3, it can be seen how individual measurements 62 download speed on a vertical axis 64, can be plotted against direction on a polar axis 66. By interpolating between the data points 62, it is possible to model the spatial relationship between download speed and direction as a surface 68. An estimate of a direction to the access point can then be obtained by calculating the direction from the axis 64 in which the surface 68 of the plot has the greatest increasing gradient 70. This direction can be indicated on the gauge 60 by an arrow 72 surrounding the download speed indicator 60.

Further, by extrapolating the surface 68, it is possible to estimate what the download speed might be if the mobile device 50 were to be moved in the indicated direction 72 by a certain amount, which estimate may be provided in an estimation area 74 of the speed indicator area 58 of the display 52. Thus, a user is able to readily know how long it will take to download selected content, and will be provided with information that will help him or her to decide whether or not to move location, and if so, in what direction and by how much.

Of course, the mobile device is configured, through pre-loaded connection settings to automatically seek and connect to wireless access points corresponding to a particular service provider. Such functionality enables the mobile device to automatically connect to a subscribed access point upon detection of the same, and optionally, to alert the user, for example, by way of an audible, visual or vibrating signal, that the subscribed access point has been identified and/or connected to. Thus, a user, say, upon entering a cinema or airport equipped with a booth 18 as described above, may automatically be alerted and offered WiFi download services.

It will be appreciated that the design of the booth 18, with its NFC tags 32, its indicia 40 and the design of the display interface 50 of the mobile device 52 is adapted to encourage users to move as close as possible to the wireless access point, thus enabling the wireless network to be used more efficiently, and/or to maximise the download speed of content to individual mobile devices, or to more than one mobile device simultaneously or sequentially.

The invention is not restricted to the details of the foregoing embodiments, which are merely exemplary of the invention.

The following statements are not the claims, but relate to various aspects of the invention:

Statement 1. A means of encouraging users of wireless devices to position themselves as close as possible to a wireless access point to which the said wireless device or devices are connectable.

Statement 2. The means of statement 1, comprising means for encouraging the initiation of a download from as close as possible to the wireless access point.

Statement 3. The means of statement 2, comprising a near field communication tag located near to, or at, the wireless access point, which near field communications tag is adapted to initiate a download to the wireless device.

Statement 4. The means of statement 3, wherein the near field communications tag is pre-loaded with data identifying a particular electronic file to download such that when a suitably enabled wireless device is brought into close proximity with the said tag, a download is automatically initiated.

Statement 5. The means of any preceding statement, comprising a signal strength indicator configured to indicate the strength of a signal, at the wireless device, emanating from the wireless access point.

Statement 6. The means of statement 5, wherein the signal strength is indicated as any one or more of the group comprising: the actual signal strength measured in dB; an estimate of the download time for a given amount of data; download speed in bits per second; and an estimated distance between the wireless device and the wireless access point.

Statement 7. The means of statement 5 or statement 6 comprising indicia on a floor disposed at different radial positions and distances from the wireless access point.

Statement 8. The means of statement 7, wherein the indicia additionally comprise an arrow or pointer indicating a direction towards the wireless access point.

Statement 9. The means of any preceding statement, comprising a signal strength meter or gauge configured to measure the actual strength of a wireless signal emanating from the wireless access point.

Statement 10. The means of statement 9, wherein the wireless device comprises means adapted to download a specific amount of data and to measure and record the time it takes to the download the said specific amount of data.

Statement 11. The means of statement 10, wherein the wireless device further comprises a movement sensor and the measured download times are recorded as a function of position ascertained by the movement sensor.

Statement 12. The means of statement 11, wherein the movement sensor comprises any one or more of the group comprising: a gyroscope, a compass and an accelerometer.

Statement 13. The means of statement 12, wherein a direction from the wireless device to the wireless access point is estimated by the steps of: plotting download speed as a function of position, interpolating between the measurements to create a spatial representation of signal strength as a function of direction from the wireless device; and estimating a direction to the wireless access point corresponding to a direction in which the gradient of the spatial representation is substantially maximised.

Statement 14. The means of any of statements 5 to 13, wherein the wireless device comprises a graphical user interface comprising a display area configured to display a download speed and/or a direction to the wireless access point.

Statement 15. A downloading apparatus comprising an internet-connected computer adapted to download content from a web-based file server, a data storage device adapted to store the said downloaded content, and a wireless access point operatively connected to the data storage device and being configured to transmit portions of the said content to selected wireless devices, wherein the downloading apparatus further comprises means according to any preceding statement for encouraging users of the said wireless devices to position themselves as close as possible to the said wireless access point to which the said wireless device or devices are connectable.

Statement 16. The downloading apparatus of statement 15, further comprising a display screen providing a graphical user interface for browsing and selecting content from the data storage device to be transmitted to a wireless device.

Statement 17. The downloading apparatus of statement 16 when dependent on statement 3 or statement 4, wherein the near field communications tag or tags are located adjacent an edge of the display screen.

Statement 18. The downloading apparatus of any of statements 15, 16 or 17, further comprising means for synchronising the content of the data storage device with selected content from one or more web-accessible file servers.

Statement 19. The downloading apparatus of any of statements 16 to 18, further comprising an administrator platform adapted to monitor, control and manage the storage of data on the data storage device.

Statement 20. The downloading apparatus of any of statements 16 to 19, further comprising a gateway device interposed between the data storage device and the wireless access point.

Statement 21. The downloading apparatus of any of statements 16 to 20, further comprising a payment terminal.

Statement 22. A downloading apparatus as claimed in statement 20, wherein the payment terminal interfaces with the administrator platform for reconciling payment transactions with user data and downloaded content.

Statement 23. A means or apparatus of any preceding statement, wherein the wireless device and wireless access point communicate with one another using WiFi.

Statement 24. A means or apparatus of statement 23, wherein the wireless device is configured, through pre-loaded connection settings to automatically seek and connect to wireless access points corresponding to pre-specified WiFi service providers.

Statement 25. A means or apparatus of any preceding statement, wherein the wireless device is any one or more of the group comprising: a mobile telephone, a tablet PC and a laptop computer.

Statement 26. A method of determining a direction towards a wireless access point comprising the steps of: by repeatedly polling the access point and downloading a data file of a known size; measuring the time it takes to complete each download to yield an instantaneous download speed; monitoring and the position of the wireless device and plotting measured download speed at different measured positions; interpolating between the data points to model the download speed as a function of position; and, based on the model, determining a direction from the wireless in which the download speed increases most rapidly and determining that the said direction from the wireless in which the download speed increases most rapidly corresponds to the direction of the wireless access point from the wireless device.

Statement 27. The method of statement 26 performed on in software on the wireless device.

Statement 28. The method of statement 27, wherein the direction to the wireless access point is indicated in a graphical user interface of the wireless device.

The invention claimed is:

1. A file server comprising: a data storage device adapted to store multimedia content; and a wireless access point adapted to wirelessly interconnect, via a wireless data signal, the data storage device to a wireless device, the file server being configured to wirelessly transmit selected portions of the stored multimedia content to the wireless device, and being characterised by:
 a directional signal strength gauge configured to determine the strength of the wireless data signal at the wireless device and to determine a direction from the wireless device to the wireless access point and by:
 the directional signal strength gauge being configured to repeatedly broadcast a specific amount of data from the file server and to measure and record the time it takes to download the said specific amount of data on the wireless device: the strength and/or reliability of the wireless data signal at the wireless device being inversely related to the download time for the said specific amount of data; and by
 the file server being configured to repeatedly poll the wireless device to monitor changes over time the strength and/or reliability of the wireless data signal received by the wireless device and for the wireless device's location and/or movement data, wherein
 the directional signal strength gauge is configured to estimate or determine the direction from the wireless device to the wireless access point by: plotting download speed as a function of position, interpolating between corresponding measurements of download speed and position to create a spatial representation of signal strength as a function of the position of the wireless device; and estimating a direction to the wireless access point corresponding to a direction in which the gradient of the spatial representation is substantially maximised.

2. The file server of claim 1, wherein the directional signal strength gauge is located on the file server.

3. The file server of claim 1, wherein the directional signal strength gauge comprises an application executed in the wireless device, the application being configured to determine and exchange with the file server, the strength and/or reliability of the received wireless data signal.

4. The file server of claim 1, configured to poll the wireless device for an indication of the strength and/or reliability of the wireless data signal received by the wireless device.

5. The file server of claim 1, wherein the wireless device comprises a movement sensor comprising any one or more of the group comprising: a gyroscope, a compass, an accelerometer and a global positioning system, and wherein the file server is adapted to repeatedly poll the movement sensor for the wireless device's location and/or movement data.

6. The file server of claim 1, adapted to display on the wireless device, the direction to the wireless access point; and comprising an application executed in the wireless device, the application being operatively connected to the file server and comprising a graphical user interface comprising a display area configured to display the direction to the wireless access point and optionally, an indication of download speed.

7. The file server of claim 1, wherein the directional signal strength gauge is configured to start/stop and/or throttle the transmission of the selected multimedia content to the wireless device in relation to detected strength of the wireless data signal at the wireless device.

8. The file server of claim 1, comprising a near field communications tag located near to, or at, the wireless access point, which near field communications tag is adapted to initiate a download to the wireless device when the wireless device, comprising an near field communications reader comes into range of the said tag.

9. The file server of claim 1, wherein the signal strength is indicated as any one or more of the group comprising: the actual signal strength measured in dB; an estimate of the download time for a given amount of data; download speed in bits per second; and an estimated distance between the wireless device and the wireless access point.

10. The file server of claim 1, comprising an internet-connected computer adapted to download content from a web-based file server and to store it on the data storage device.

11. The file server of claim 1, wherein the wireless device and wireless access point communicate with one another using Wi-Fi, wherein the wireless device is configured, through pre-loaded connection settings to automatically seek and connect to wireless access points corresponding to pre-specified Wi-Fi service providers.

12. The file server of claim 1, wherein the wireless device is any one or more of the group comprising: a mobile telephone, a tablet PC and a laptop computer.

13. The file server of claim 8, wherein the near field communications tag is pre-loaded with data identifying a particular electronic file to download such that when the tag comes within range of the wireless device's near filed communications reader, a download of the said particular electronic file is automatically initiated.

14. The file server of claim 8, further comprising a display screen providing a graphical user interface for browsing and selecting content from the data storage device to be transmitted to the wireless device.

15. The file server of claim 10, further comprising means for synchronising the content of the data storage device with selected content from one or more web-accessible file servers.

16. The file server of claim 14, wherein the near field communications tag or tags are located adjacent an edge of the display screen.

17. The file server of claim 15, further comprising an administrator platform adapted to monitor, control and manage the storage of data on the data storage device.

18. The file server of claim 17, further comprising a gateway device interposed between the data storage device and the wireless access point.

19. The file server of claim 18, further comprising a payment terminal, wherein the payment terminal interfaces with the administrator platform for reconciling payment transactions with user data and downloaded content.

* * * * *